INVENTOR
GÖTE INGVAR BORGSTRÖM

United States Patent Office 3,143,825
Patented Aug. 11, 1964

3,143,825
SPOONS FOR FISHING BAITS
Göte I. Borgström, Marieberg, Svangsta, Sweden
Filed July 14, 1958, Ser. No. 748,307
Claims priority, application Sweden July 13, 1957
4 Claims. (Cl. 43—42.17)

Fishing baits are known which are provided with spoons which are rotatable around the longitudinal axis of the bait bar when pulled through the water. Said spoons are intended to cause vibrations in the water in order to capture the attention of fish and thus tend to make the bait more attractive.

It has proved considerably to increase the power of attraction of such baits, if the spoon according to the present invention is along and within its longitudinal edges provided with protuberances and openings which, when the spoon is rotating around the fastening device of the bait, are causing sound and other waves which are adapted to attract the attention of the fishes.

The invention will be described in greater detail in the following specification with reference to the accompanying drawing which schematically by way of example shows an embodiment of a spoon for fishing baits according to the invention.

Figure 1:
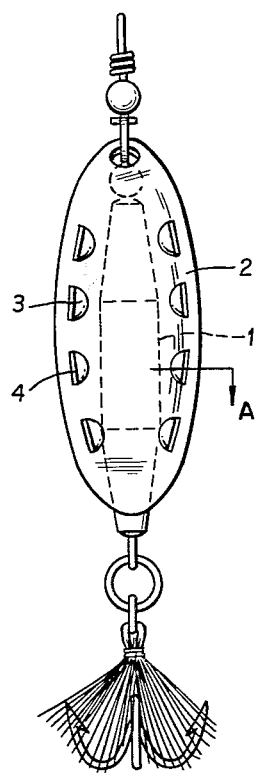
FIG. 1 shows a fishing bait with a spoon in plan view.
Figure 2:
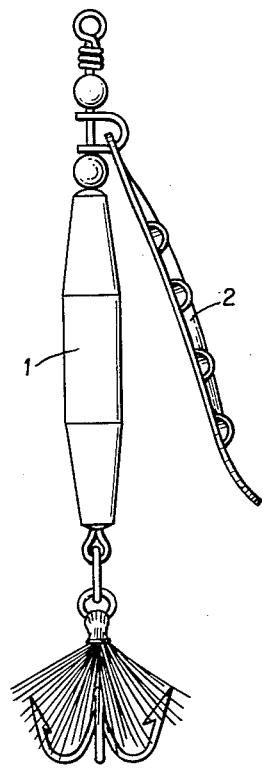
FIG. 2 shows the spoon turned 90° in relation to FIG. 1.
Figure 3:
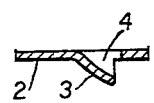
FIG. 3 is a section seen in direction of the arrow A in FIG. 1.

In the drawing, 1 denotes the fishing bait itself, which, however, is not object of the present invention. 2 denotes the spoon spoon-like blade which is rotatable around the longitudinal axis of the bait, the spoon having a concavo-convex shape.

In order to make the fishing bait more attractive to fish, the spoon is along and adjacent the longitudinal edges provided with protuberances 3 and openings 4 so that when dragging the bait through the water, the rotation of the spoon around its fastening device on the bait will cause sound and other waves which attract the attention of the fishes.

The protuberances are convex and the openings semicircular, the longitudinal axes of the protuberances and of the openings being directed approximately perpendicularly to the longitudinal axis of the spoon. The bases of the semicircular openings of the protuberances are according to the invention directed generally parallel to the longitudinal edges of the spoon.

Figure 4:
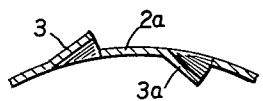
FIG. 4 shows a fragmented sectional elevation similar to FIG. 3 but showing another embodiment of the invention in which the protuberances are on both the convex and concave side.

The protuberances, instead of being disposed entirely on the upper convex surface of the spoon, may be provided alternatingly on the convex and the concave surface of the spoon as shown in FIG. 4 where spoon 2a has protuberance 3 on the convex side and protuberance 3a on the concave side.

The protuberances and the openings will, upon rotation of the spoon around the longitudinal axis of the fishing bait, cause sound and other waves in the water, which are attractive to the fishes so that they will tend to bite more readily than with some other baits. A fishing bait with a spoon according to the invention will render it possible to make more considerable fishing.

The invention shall not be limited to the here above described embodiment and shown in the drawing, but the details of which may be varied and combined in various ways without departing from the spirit of invention or limiting or overstepping the scope of protection.

What I claim as new and wish to protect by Letters Patent is:

1. A lure having a bait body connectable at its forward end to a line and at its rearward end to a hook, a spoon-like blade mounted forwardly of said bait body for free rotation thereabout, said blade being formed with a convex surface portion and a concave surface portion, cup shaped protuberances extending from at least one of said surface portions and disposed along the outer edge of said blade, said blade having apertures formed therein contiguous to said protuberances and on the side of said protuberances nearest the outer edge of said blade to cause vibration when said lure is drawn through water.

2. A device according to claim 1 and further characterized by said protuberances extending from the convex surface portion.

3. A device according to claim 1 and further characterized by said protuberances extending alternately from said concave surface portion and said convex surface portion.

4. A device according to claim 1 and further characterized by said protuberances being constructed and arranged to form said apertures as substantially semicircles.

References Cited in the file of this patent
UNITED STATES PATENTS

| | | |
|---|---|---|
| 1,558,249 | De Zeng | Oct. 20, 1925 |
| 1,956,783 | Yeo | May 1, 1934 |
| 2,632,276 | Hale | Mar. 24, 1953 |

FOREIGN PATENTS

| | | |
|---|---|---|
| 720,641 | France | Dec. 4, 1931 |
| 848,036 | France | July 17, 1939 |
| 262,197 | Switzerland | Sept. 16, 1949 |